(12) United States Patent
Ash et al.

(10) Patent No.: US 7,153,380 B2
(45) Date of Patent: *Dec. 26, 2006

(54) METHOD OF AFFIXING A PRE-FORMED GASKET AND GASKET USED THEREFOR

(75) Inventors: Charles E. Ash, Perrysburg, OH (US); Thomas S. Hicks, Allen, MI (US)

(73) Assignee: Pilkington North America, Inc., Toledo, OH (US)

( * ) Notice: Subject to any disclaimer, the term of this patent is extended or adjusted under 35 U.S.C. 154(b) by 165 days.

This patent is subject to a terminal disclaimer.

(21) Appl. No.: 11/078,426

(22) Filed: Mar. 11, 2005

(65) Prior Publication Data

US 2005/0155696 A1 Jul. 21, 2005

Related U.S. Application Data

(63) Continuation of application No. 10/417,039, filed on Apr. 16, 2003, now Pat. No. 6,899,935.

(51) Int. Cl.
*B60J 1/00* (2006.01)

(52) U.S. Cl. .................. 156/108; 156/444; 428/46; 428/122; 428/217

(58) Field of Classification Search ................ 428/122, 428/46, 217, 519, 523; 156/108, 444
See application file for complete search history.

(56) References Cited

U.S. PATENT DOCUMENTS 6,899,935 B1 * 5/2005 Ash et al. ................. 428/46

\* cited by examiner

*Primary Examiner*—Leszek B. Kiliman
(74) *Attorney, Agent, or Firm*—Marshall & Melhorn, LLC

(57) ABSTRACT

A method of affixing a gasket to a transparent substrate utilizing a fixture having a channel formed therein, into which the gasket is inserted and held in place by, for example, a vacuum. Alternatively, a removable form may be inserted into the channel, and the elastomeric member/gasket is inserted into the removable form. A suitable substrate is precisely positioned on the fixture in a predetermined position relative to the elastomeric member. An adhesion promoting primer may be applied to the substrate, and an adhesive may be applied to the gasket, or to the substrate. The elastomeric member is then bonded to the transparent substrate. Finally, the completed assembly is removed from the fixture.

11 Claims, 11 Drawing Sheets

METHOD OF AFFIXING A PRE-FORMED GASKET AND GASKET USED THEREFOR

RELATED APPLICATION

This application is a continuation of U.S. patent application Ser. No. 10/417,039, filed Apr. 16, 2003 now U.S. Pat. No. 6,899,935, which is herein incorporated by reference in its entirety.

FIELD OF THE INVENTION

The invention herein relates to an aesthetically pleasing elastomeric member and a cost-effective method of affixing same to a substrate.

More specifically, the invention relates to a unique, dual durometer gasket which, in a preferred embodiment, forms a so-called single-side encapsulation when affixed to a substrate, for example, a vehicle glazing. The subject dual durometer gasket is affixed to such substrate by placement into a fixture, where it is held in precise position in such fixture, and is urged into bonding contact with such substrate.

BACKGROUND

It has long been known to affix an elastomeric member, for example a gasket, to a substrate, where such gasket creates a surround or a frame around the periphery of a substrate in order that such substrate may be inserted into an opening where the gasket may perform a variety of functions such as weather sealing, shock absorption, and more recently, as an external appearance/design feature of, for example, a motor vehicle.

Historically, elastomeric members, particularly gaskets, have been affixed to the periphery of only one major surface of a substrate, creating a so-called single-side glazing.

It has been common practice for some years now, to affix such gaskets, as are described above, to a substrate by processes where the gasket is affixed at the same time as it is formed. In-situ molding processes, such as reaction injection molding (RIM), and injection molding of a thermoset compound, such as polyvinyl chloride (PVC), have been particularly favored.

Such molding processes necessitate the use of precisely machined and expensive molds, having male and female halves, which are inserted into hydraulically or pneumatically operated presses. Typically, a portion of the mold is machined into the desired shape of the gasket, such that when a substrate is placed into the mold, the halves of the mold are closed by the press and a polymeric material or materials is/are injected into the mold cavity forming the desired gasket around a portion of, or the entire periphery of, the substrate.

Prior to injection of the polymeric material, for example a polyurethane or PVC, it is known to apply an adhesion-promoting primer, such as a silane material, to the portion of the substrate to which the gasket is to be affixed. As it is formed in the molding process, the gasket becomes firmly affixed to the primed portion of the substrate.

While such molding processes are useful, due to the increasingly complex gaskets required by vehicle manufacturers, such molding processes have become, likewise, increasingly complex, and due to this complexity, increasingly costly.

Due to the design of such gaskets as have been described above, their being in intimate contact with the opening in a vehicle body, and the fact that when in motion, vehicle bodies "flex", thus distorting to some degree the openings in such vehicle bodies, there may be some rubbing contact between such gasket and the sheet metal of the vehicle body creating an undesirable sound, sometimes known as "squeak." Much time and effort has gone into finding ways to eliminate such squeak, but this has proven to be a difficult and expensive problem to diagnose and solve.

Accordingly, it would be desirable to have a relatively simple, cost-effective method of affixing a gasket to a substrate, while at the same time having the gasket thus affixed perform the multiple functions of providing an aesthetically pleasing weather seal for a single side encapsulation, and minimizing the occurrence of "squeak".

SUMMARY OF THE INVENTION

The present invention is a method of bonding an elastomeric member, such as a gasket, to a substrate material, such as glass or plastic to form an assembly which is suitable for filling an opening in a vehicle body.

The method of making the subject assembly comprises providing a positioning fixture in which a channel of a predetermined shape has been formed. One or more apertures penetrate the channel, preferably the bottom portion of the channel, such that the channel is in communication with a source of either positive or negative air pressure. Negative air pressure, i.e. a vacuum, may be applied with a force sufficient to hold for example, an elastomeric member, securely and accurately, in position in the channel.

An elastomeric member or a device suitable for holding an elastomeric member is inserted into the channel. An adhesive material may be applied to the elastomeric member, or may have been applied to it prior to its insertion into the channel of the positioning fixture.

A substrate material is then placed onto the fixture so that, at least, selected portions of a peripheral portion of a substrate surface are positioned above and extending over the channel holding the elastomeric member.

If an adhesive material was not previously applied to the elastomeric member, as described above, an adhesive material may have been applied to, at least, a portion of the peripheral portion of the substrate which is positioned over the channel. The adhesive would necessarily have been applied to the portion of the surface of the substrate which faces the channel opening so that bonding of the elastomeric member and the substrate may be achieved.

At a predetermined time, the negative air pressure is terminated, and a positive air pressure is applied through the previously described apertures with a force sufficient to raise the elastomeric member or device for holding such elastomeric member out of the channel and into bonding contact with the peripheral portions of the substrate which extend over the channel.

After a predetermined time, the positive air pressure is terminated and the substrate with elastomeric member bonded thereto is removed from the fixture.

DETAILED DESCRIPTION OF THE PREFERRED EMBODIMENT

Figure 1:
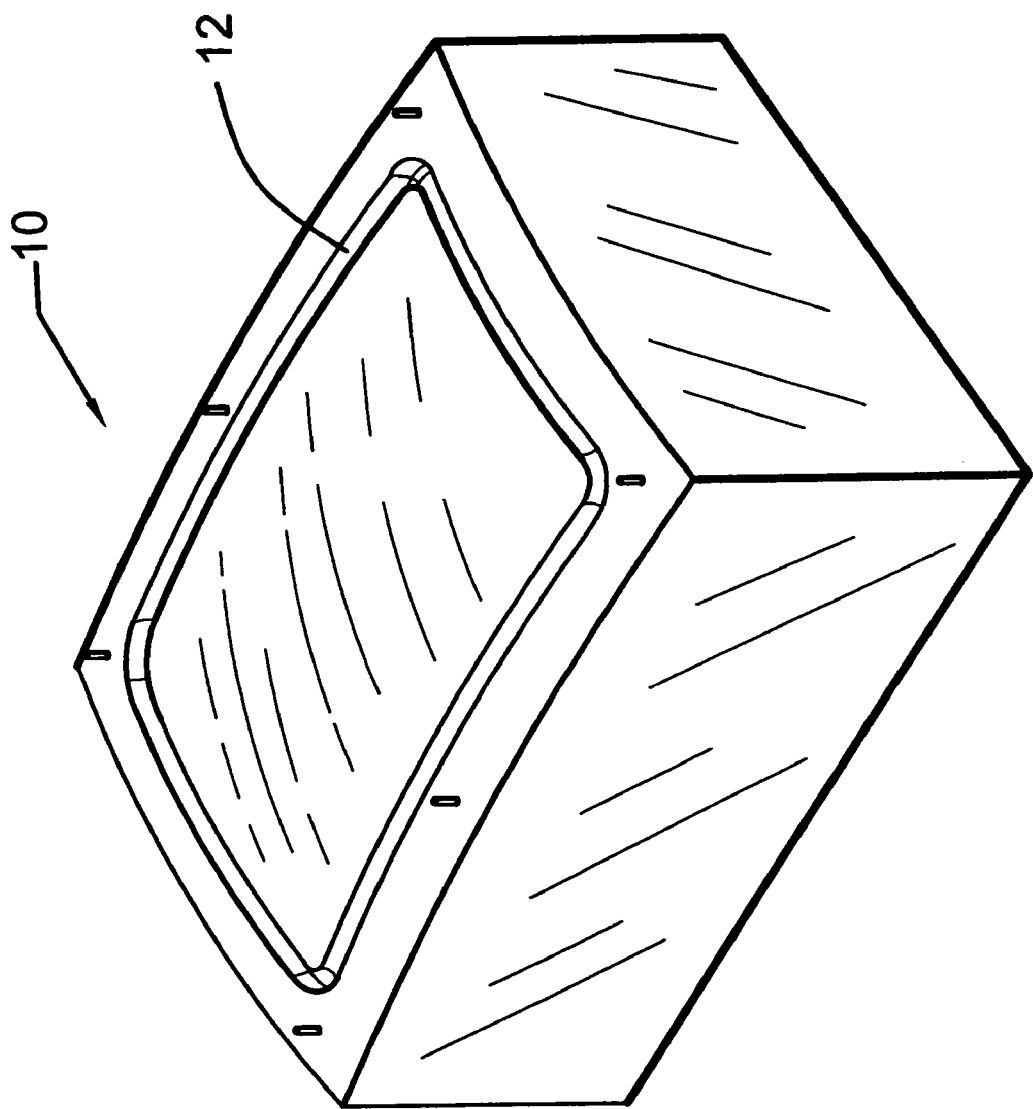
FIG. 1 is an isometric view of a representative pre-configured channel into which a gasket is inserted.

As shown in FIG. 1, in the present invention, a fixture 10 is provided, the fixture 10 being comprised of a thermally stable material such as aluminum, wood, steel, epoxy, silicone and certain urethanes, into which a channel 12 is formed. The channel 12 may be in the shape of the pre-formed elastomeric member which will be inserted into such channel. In the channel 12, preferably in the bottom of such channel 12, apertures 22 are formed to allow communication with a source (not shown) of positive 28 or negative 30 air pressure.

Figure 1A:
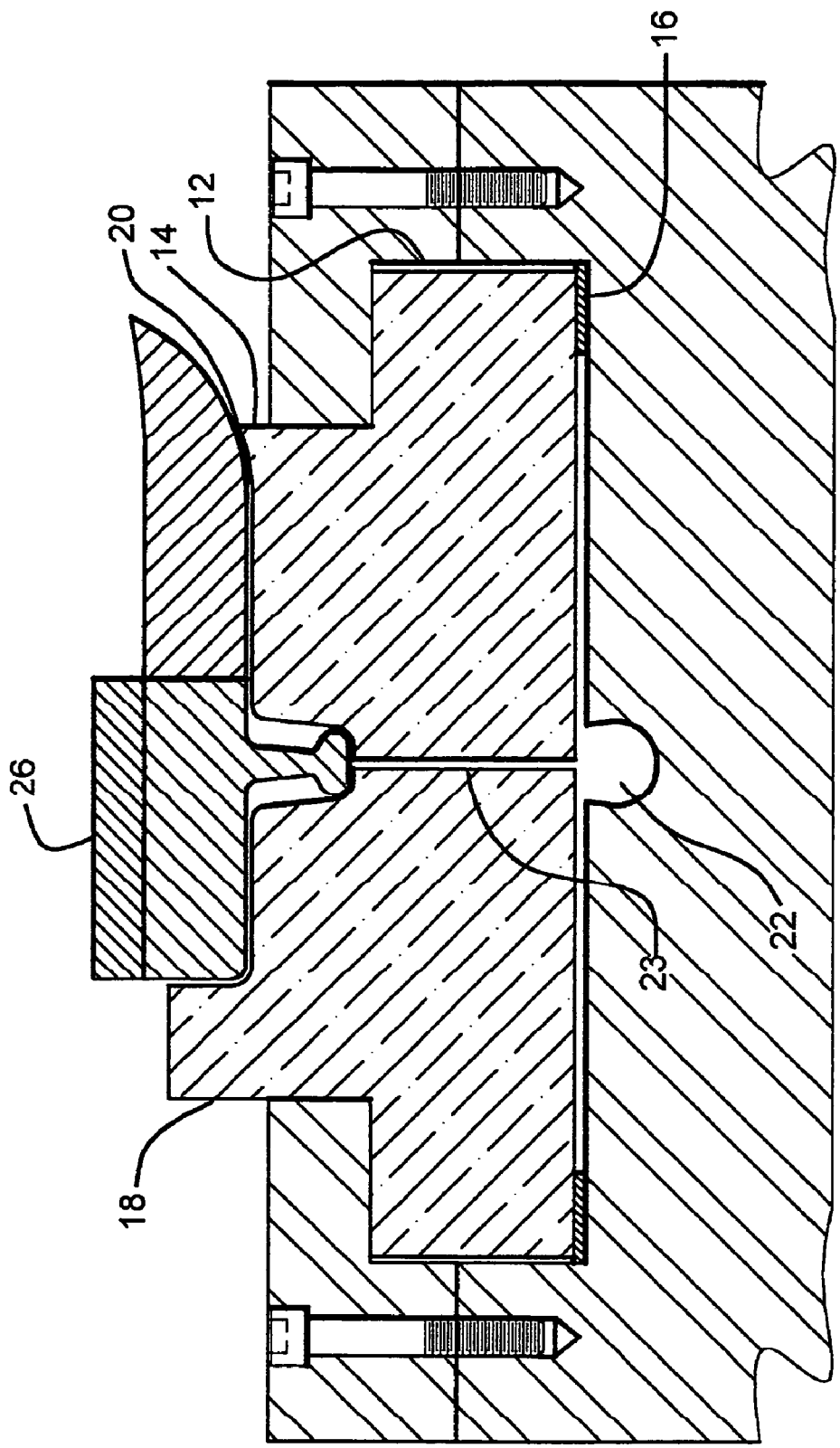
FIG. 1A is a cross sectional view of a fixture having a rectangular channel containing a removable form into which an elastomeric member has been placed.

Alternatively as shown in FIG. 1A, a rectangular channel may be formed in the fixture 10, capable of receiving a replaceable form 14, a lower portion 16 of which is inserted into the channel 12 in the fixture, and an upper portion 18 of which extends above the depth of the channel 12 and has a surface 20 configured in the shape of the profile of the pre-formed gasket. Holes 23 are formed through the entire thickness of the fixture 10 to allow communication of positive air pressure 28, or negative air pressure 30 (i.e. to form a vacuum), between the air pressure source (not shown) and the replaceable form 14.

The replaceable form 14 may be made of a rigid, but easily shaped material, such as a polymeric material with good "recovery" properties, preferably an extruded silicone material.

Figure 2:
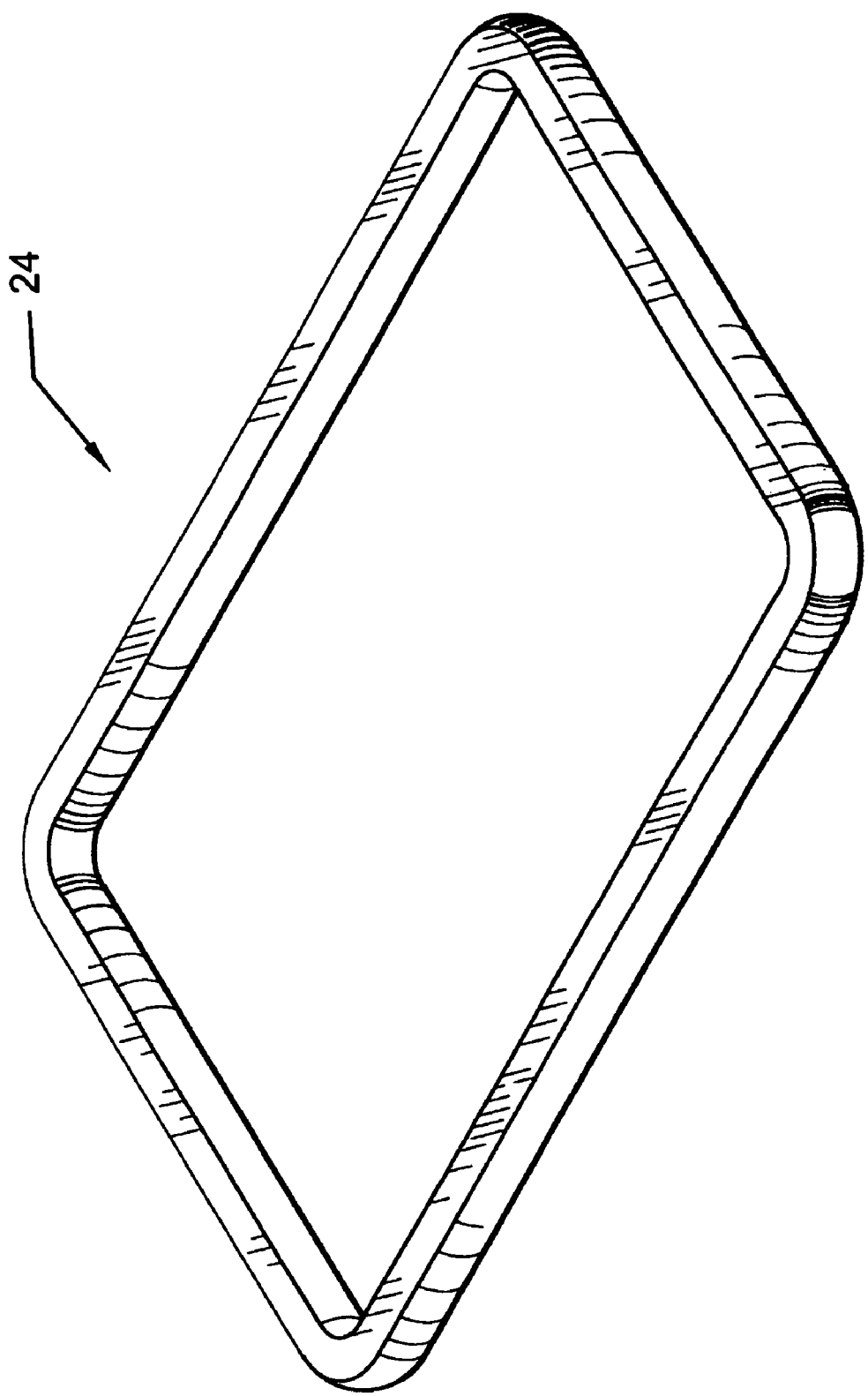
FIG. 2 is an isometric view of a preformed gasket to be inserted into the fixture.
Figure 3:
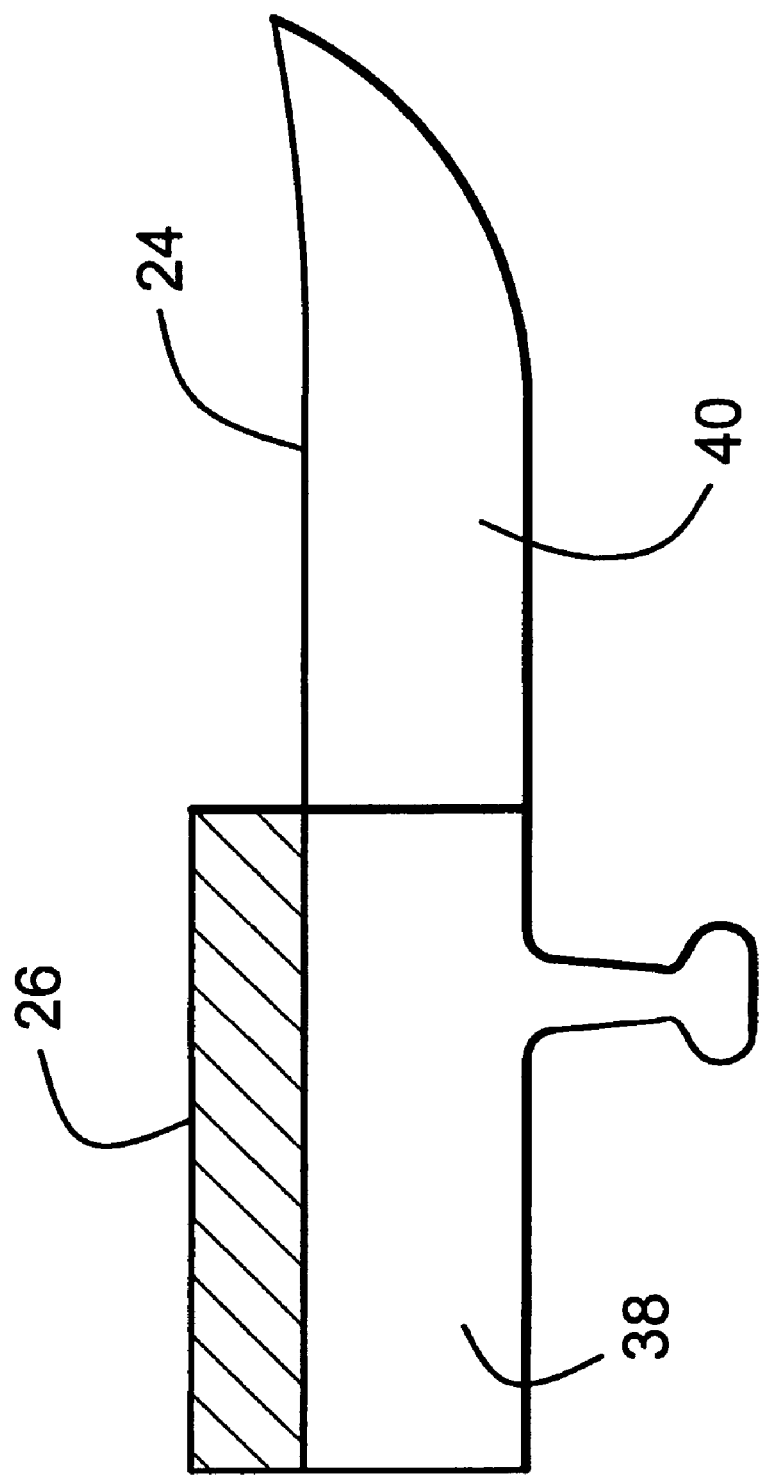
FIG. 3 is a cross-sectional view of the preformed gasket of FIG. 2.
Figure 4:
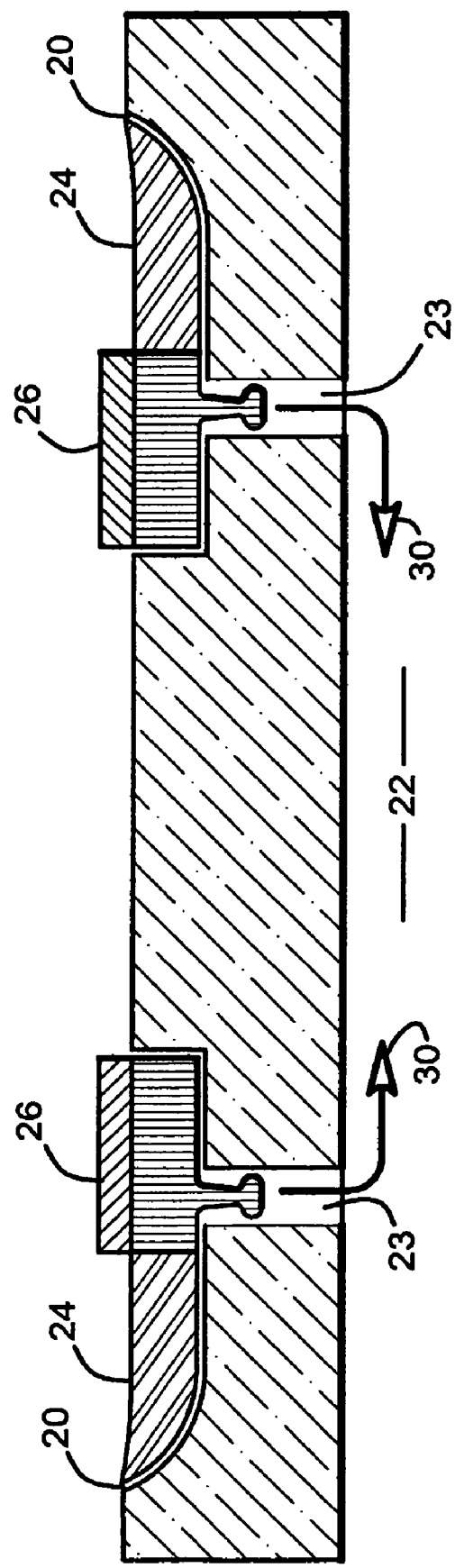
FIG. 4 is a cross-sectional view of the fixture of FIG. 1 with a gasket inserted into the channel therein and illustrating a vacuum being applied to the inserted gasket.
Figure 5:
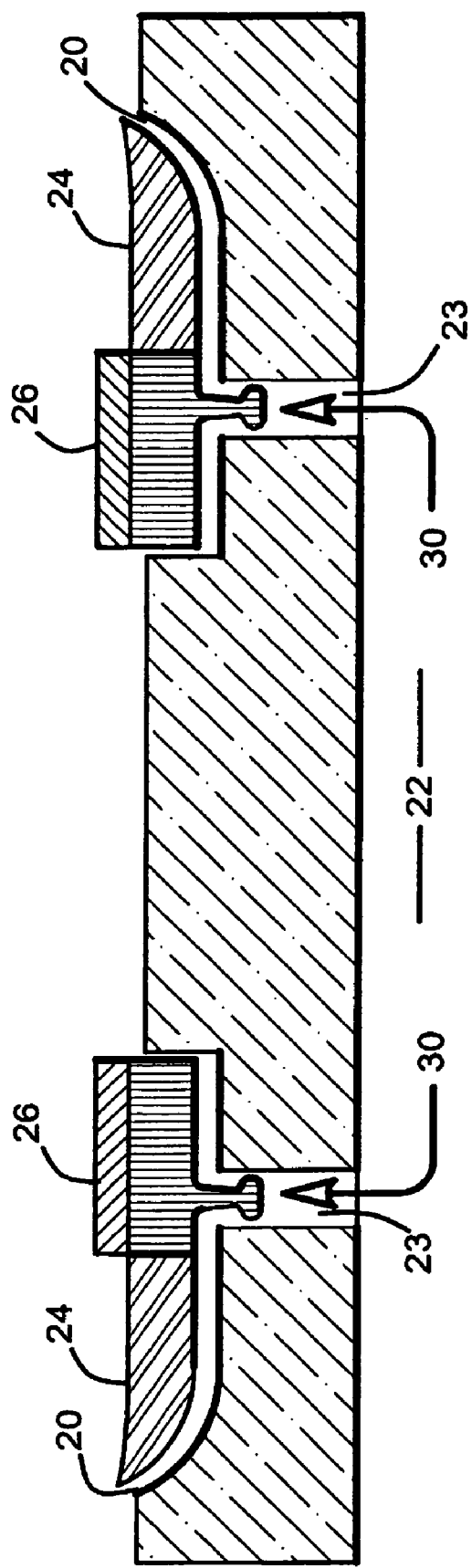
FIG. 5 is a cross-section view of the fixture of FIG. 4 with gasket inserted, the vacuum having been terminated, and a positive air pressure applied to lift the gasket from the channel.
Figure 6:
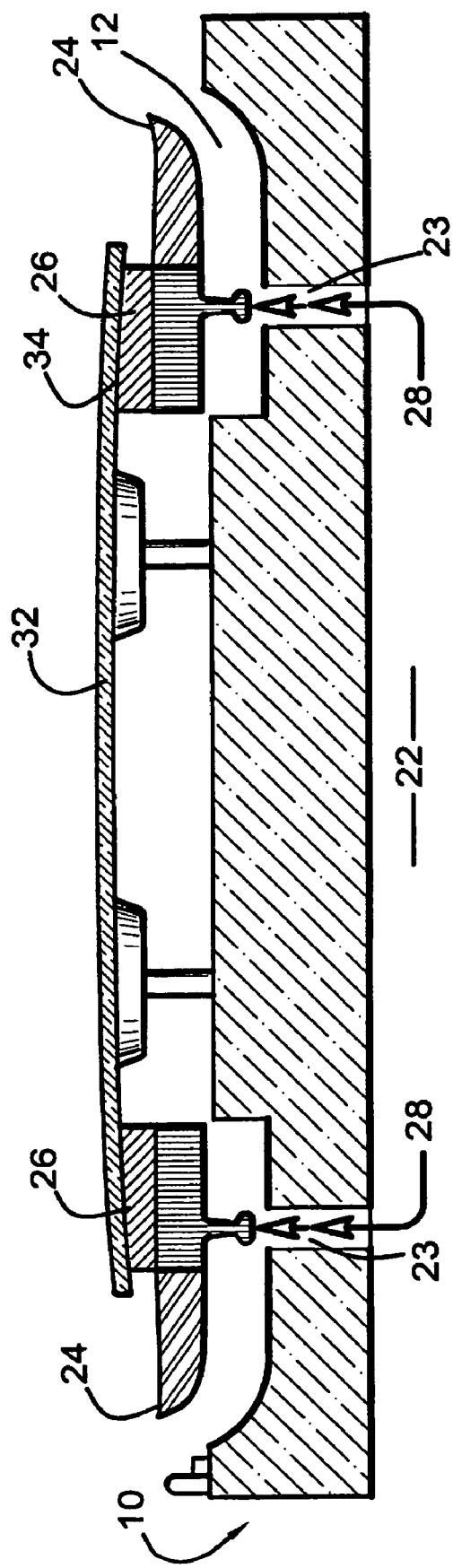
FIG. 6 shows the gasket lifted from the channel and being adhered to a substrate which has been placed onto the fixture.

A preformed elastomeric member 24 as generically shown in FIG. 2, and in a more specific profile in FIG. 3, is inserted manually, or by an electromechanical device (not shown), such as a robot or the like, into the channel 12 in the above-described fixture 10. The elastomeric member 24 is preferably a gasket, and most preferably, a gasket having portions made from materials of differing durometer. The elastomeric member 24 is held in the desired position in the channel 12 by pneumatic means, shown schematically in FIG. 4, preferably by applying a vacuum to the elastomeric member 24. As shown in FIGS. 1A, 4, and 6, any suitable liquid adhesive 26 such as a urethane, an acrylic or hot-melt pressure sensitive adhesive, may be applied to the elastomeric member 24. Alternatively, an adhesive tape having adhesive on both sides of the tape may be adhered to the elastomeric member 24.

As shown in FIG. 6, a substrate 32, preferably a glass substrate, and most preferably a glass substrate fabricated into a shape suitable for a vehicle glazing, is placed manually, or by electromechanical means, onto the above-described fixture 10.

An adhesion promoting primer 34, preferably a silane primer such as is made by Dow Automotive, Ashland Chemical and Lord Chemical, is preferably applied to the portion of the substrate 32 to which the elastomeric member 24, such as a gasket, is to be affixed.

It is also within the scope of the invention to apply, for example, a double-sided adhesive tape to the upward facing portion of the elastomeric member 24 before it is placed into the channel 12 of the fixture 10. An adhesive material, for example, a double-sided adhesive tape could also be applied to the substrate material 32, rather than to the elastomeric member 24, prior to placement of the substrate material 32 onto the fixture 10, in which channel 12 of such fixture 10, the elastomeric member 24 has already been placed.

In the event a double-sided adhesive tape is utilized to bond the elastomeric member 24 to the substrate 32 it is possible that the application of an adhesion-promoting primer to the substrate may not be necessary. Elimination of the need for an adhesion-promoting primer 34 would be a benefit in reducing material cost, labor cost, and process cycle time.

So far as is currently known, use of any liquid adhesive 26 will necessitate the application of an adhesion-promoting primer 34 to the elastomeric member 24, or the substrate material, preferably to the substrate material 32, if such substrate material 32 is glass.

As shown in FIG. 6, the substrate 32 is positioned on the fixture 10 so that the portion of the substrate 32 to which the gasket 24 is to be affixed is positioned directly above the channel 12 of the above-described fixture 10 containing the prepared gasket 24. The gasket 24 is then urged into bonding contact with the substrate 32 by applying positive air pressure 28 to the gasket 24, such air pressure 28 originating from apertures 22 in the bottom of the channel 12 in the fixture 10 and traveling through holes 23 in such fixture.

Figure 7:
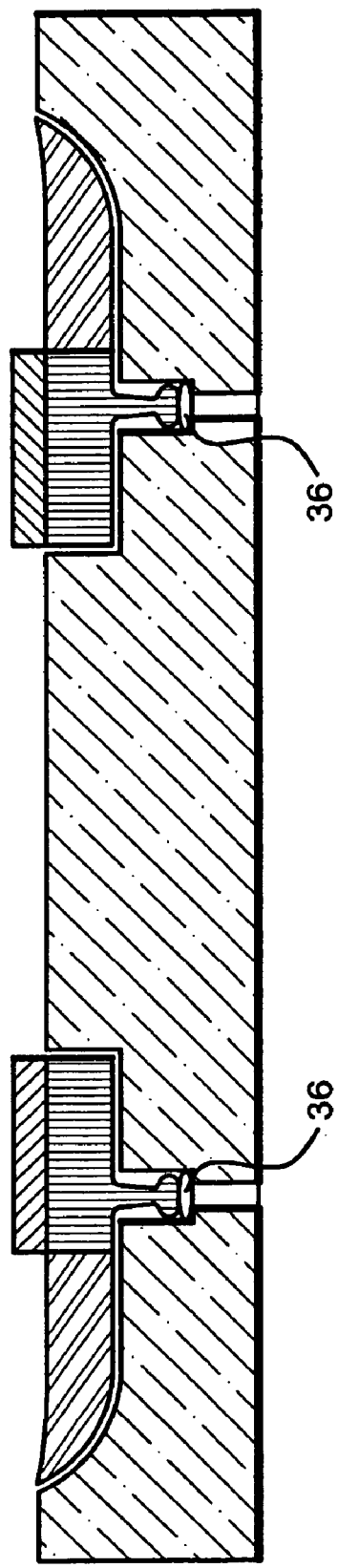
FIG. 7 shows the fixture of FIG. 1 with gasket inserted into the channel therein below which is an inflatable bladder, the bladder shown in a deflated state.
Figure 8:
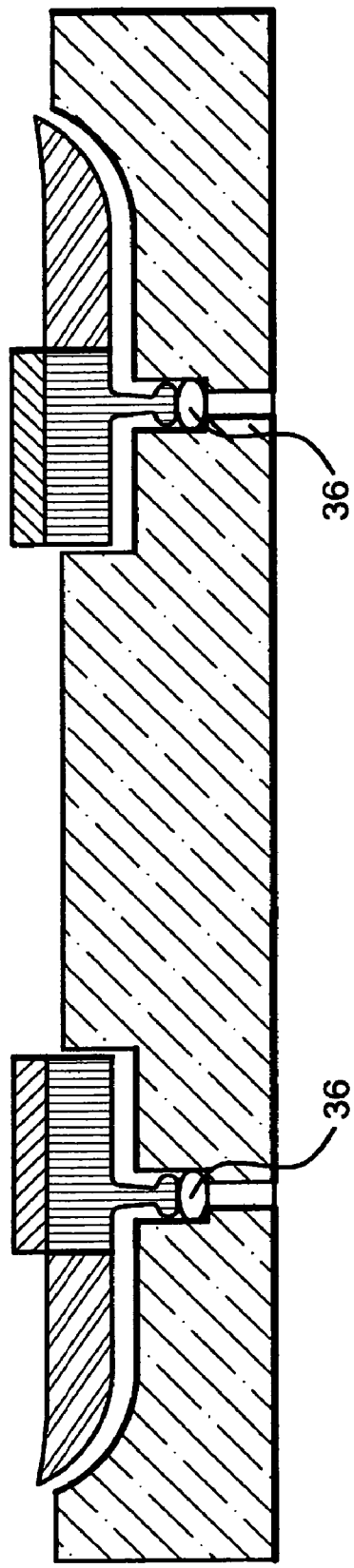
FIG. 8 shows the features of FIG. 7 with the bladder now in an inflated condition thus forcing the gasket upward in the channel.
Figure 9:
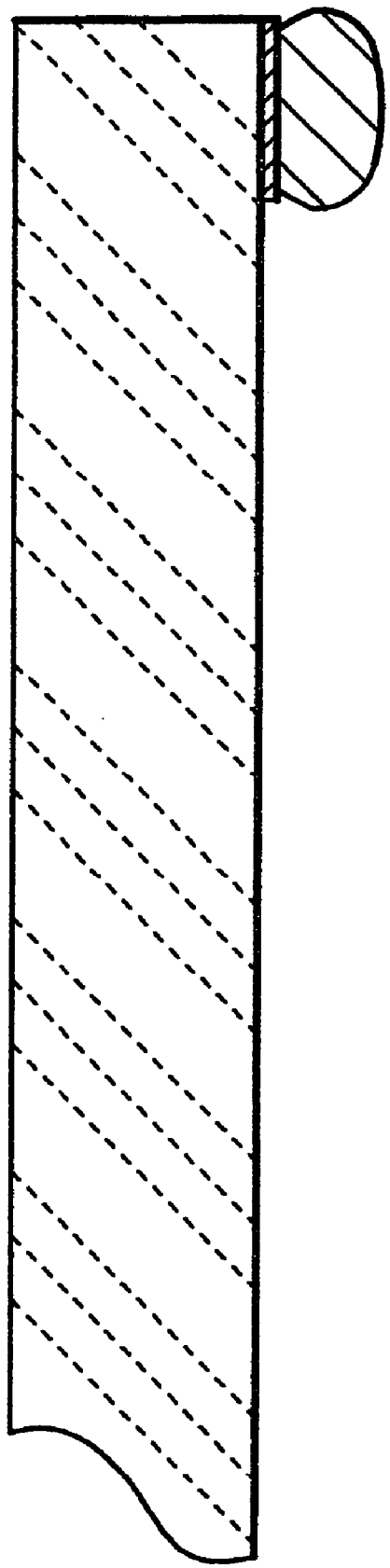
FIG. 9 shows a substrate material with gasket adhesively bonded to a single major surface of the substrate.

Alternatively, or in addition to, the use of positive air pressure 28 to bring the gasket 24 into contact with the substrate 32 as shown in FIGS. 7 and 8, one or more inflatable bladders 36 may be used to urge the gasket 24 into bonding contact with the substrate 32. Such an inflatable bladder 36, located in the channel 12 of the fixture 10, may occupy all, or a portion of, such channel 12. Preferably, such inflatable bladder 36 is used in areas where uniform adhesion may be difficult to achieve, for example, where the gasket 24 forms a relatively tight angle, such as a corner.

Figure 10:
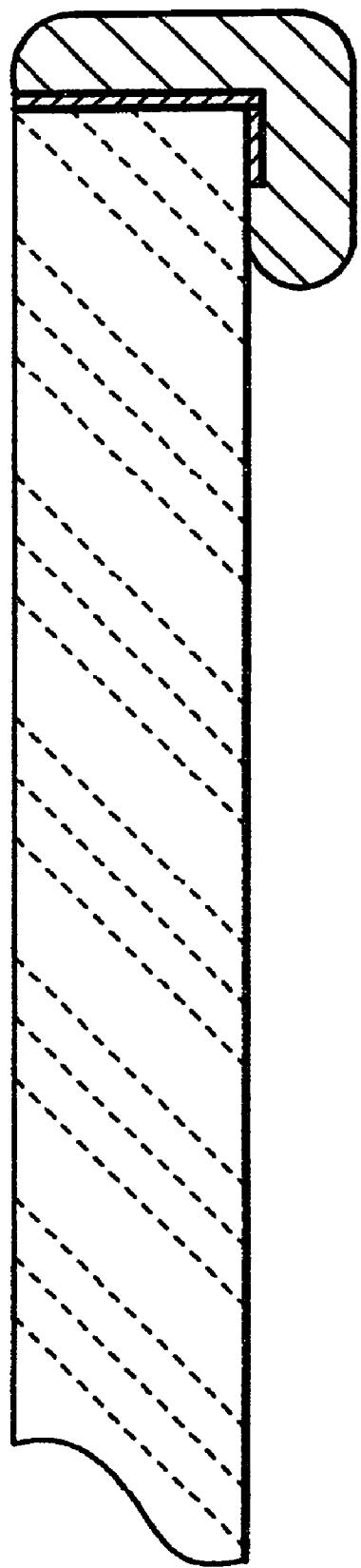
FIG. 10 shows a substrate material with gasket adhesively bonded to a major surface and an edge of the substrate.

Once affixed by this method, the gasket 24 and substrate 32 comprise a single side encapsulated assembly (see FIG. 10) which, upon curing of the adhesive, is suitable for installation in an opening, for example, in a motor vehicle. Upon suitable curing, the gasket 24 is essentially, permanently affixed to the substrate 32.

As shown in FIG. 3, the preformed gasket 24 may be composed of a thermoplastic elastomer material (TPE) having a first portion 38 comprising a relatively high durometer material, for example, a material having a durometer in the range of 80 Shore A to 40 Shore D, and a second portion 40 comprising a lower durometer material having a durometer in the range of 40 to 70 Shore A, the second portion 40 comprising lower durometer material having particular "anti-squeak" properties. Such materials are, for example, polyvinyl chloride (PVC) and Alcryn, but any suitable relatively rigid polymeric material combined with any extrudable flexible polymeric material may be used.

In compliance with the patent statutes, the invention has been described in what is considered to be its best mode. Those skilled in the art will, however, appreciate that the invention may be practiced in other modes without departing from the spirit and scope of the invention described herein.

What is claimed is:

1. A method of making a window and gasket assembly comprising:
    providing a positioning fixture having a channel of predetermined configuration formed therein, wherein said channel contains one or more apertures allowing communication with a source of a gas, or a mixture of gases, under positive or negative pressure;
    inserting a preformed elastomeric member into said channel;
    placing a transparent substrate material onto said fixture in a predetermined position relative to said elastomeric member;
    adhesively bonding said elastomeric member to a surface of said transparent substrate material to form a window and gasket assembly; and
    removing said assembly from said fixture.

2. The method of making a window and gasket assembly of claim 1 wherein said predetermined configuration of said channel formed in said positioning fixture comprises the shape of the periphery of a vehicle window.

3. The method of making a window and gasket assembly of claim 2 wherein a vacuum is applied to said elastomeric member upon placement of said elastomeric member into said channel.

4. The method defined in claim 1, wherein upon bonding of the elastomeric member and the transparent substrate material, a positive gaseous pressure is applied to the apertures in the channel of the positioning fixture to facilitate removal of the elastomeric member from said channel.

5. The method of making a window and gasket assembly of claim 1 wherein said preformed elastomeric member comprises a gasket.

6. The method of making a window and gasket assembly of claim 1 wherein said substrate material comprises glass.

7. The method of making a window and gasket assembly of claim 6 wherein said substrate material comprises plastic.

8. The method of making a window and gasket assembly of claim 1 wherein an adhesion-promoting primer is applied to at least a portion of a peripheral portion of the substrate.

9. The method of making a window and gasket assembly of claim 8 wherein said adhesion-promoting primer is comprised of a silane material.

10. The method of making a window and gasket assembly of claim 1 wherein a multi-component urethane adhesive material is applied to said gasket.

11. The method of making a window and gasket assembly of claim 1 wherein a double-sided tape is utilized to adhesively bond said transparent substrate to said elastomeric member.

* * * * *